Patented Nov. 22, 1938

2,137,236

UNITED STATES PATENT OFFICE 2,137,236

MERCURI ALKYL PHENOL DERIVATIVES

Walter G. Christiansen, Glen Ridge, N. J., and Eugene Moness, Long Island City, N. Y., assignors to E. R. Squibb & Sons, New York, N. Y., a corporation of New York No Drawing. Application September 13, 1934, Serial No. 743,840

4 Claims. (Cl. 260—622)

This invention relates to, and has for its object the provision of, certain mercuri alkyl phenol derivatives and an advantageous method of preparing them.

The compounds of this invention are mercuri alkyl phenol derivatives of the group consisting of

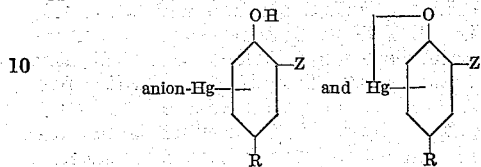

wherein Z represents a member of the group consisting of halogen and nitro, and R represents a branched-chain alkyl. They may be prepared by interacting the corresponding unmercurated alkyl phenol derivatives with mercuric acetate, and replacing the acetoxy with the desired anion by means of the compound of that anion with an alkali metal (cf. Whitmore's Organic Compounds of Mercury, 1921, pp. 257, 258). These mercuri alkyl phenol derivatives have been found to be active germicides.

EXAMPLES

*Anhydro-mercuri 2-chloro 4-tertiary-butyl phenol*

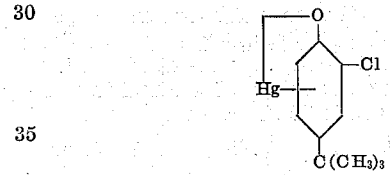

5.25 g. 2-chloro 4-tertiary-butyl phenol is dissolved in 36 cc. methyl alcohol, and while the solution is refluxed on a steam-bath, 9 g. mercuric acetate dissolved in 26 cc. water slightly acidulated with acetic acid is added rapid-dropwise with mechanical stirring. After two hours of refluxing, a test for divalent mercury being negative, and white crystals having formed, the mixture is filtered; the residue, upon being washed successively with methyl alcohol, water, and methyl alcohol, and dried, is found to be soluble in dilute alkali.

*Anhydro-mercuri 2-or-4-chloro 3,6-dimethyl phenol*

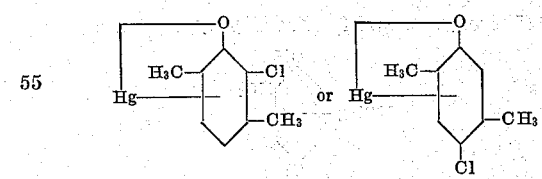

4 g. chloro, 3,6-dimethyl phenol is dissolved in 20 cc. methyl alcohol, and while the solution is refluxed on a steam-bath, 8 g. mercuric acetate dissolved in 20 cc. water slightly acidulated with acetic acid is added rapid-dropwise with mechanical stirring. After one and one-half hours of refluxing, a test for divalent mercury being negative and heavy white crystals having formed, the residue is filtered out and washed as in the first example.

*Anhydro-mercuri 2-or-4-chloro, 3,5-dimethyl phenol*

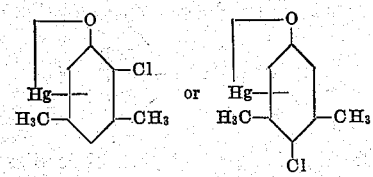

This compound is prepared precisely in accordance with the preceding example except that chloro 3,5-dimethyl phenol is substituted for chloro 3,6-dimethyl phenol.

*Anhydro-mercuri 2-chloro 4-tertiary-amyl phenol*

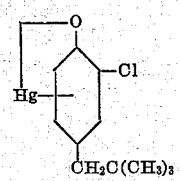

4.02 g. 2-chloro 4-tertiary-amyl phenol is dissolved in 40 cc. methyl alcohol, and while the solution is refluxed on a steam-bath, 6.40 g. mercuric acetate dissolved in 30 cc. slightly acidulated water is added rapid-dropwise with mechanical stirring. After seven hours of refluxing, a test for divalent mercury being negative, the desired compound is obtained in the form of white crystals by filtering, washing, and drying as in the foregoing examples.

*Hydroxymercuri 3-methyl 4-chloro phenol*

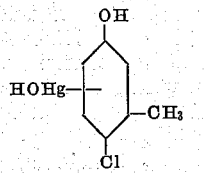

7.25 g. 3-methyl 4-chloro phenol is dissolved in 50 cc. methyl alcohol, and while the solution is refluxed on a steam-bath, 16 g. mercuric acetate dissolved in 50 cc. water is added dropwise with mechanical stirring. After five hours of refluxing, a test for divalent mercury being negative, the desired compound is obtained in the form of grayish-white crystals by filtering, washing, and drying as in the foregoing examples. Purification may be effected by dissolving in dilute alkali, filtering, and precipitating either by treating the filtrate with dilute acetic acid or by saturating the filtrate with carbon dioxide.

*Acetoxymercuri 3-methyl 4-chloro 6-isopropyl phenol*

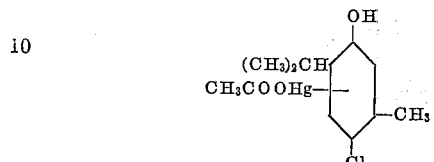

9.25 g. 3-methyl 4-chloro 6-isopropyl phenol is dissolved in 50 cc. methyl alcohol, and while the solution is refluxed on a steam-bath, 14.7 g. mercuric acetate dissolved in 50 cc. water slightly acidulated with acetic acid is added. After five hours of refluxing, a test for divalent mercury being negative, the reaction mixture is filtered, washed, and dried as in the foregoing examples, yielding the desired compound in the form of white crystals.

*Acetoxymercuri 2-chloro 4-propyl phenol*

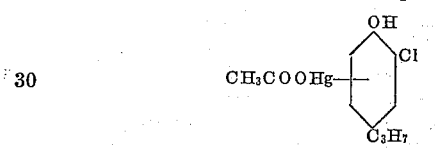

4.71 g. 2-chloro 4-propyl phenol is dissolved in 25 cc. methyl alcohol, and while the solution is refluxed on a steam-bath, 8.7 g. mercuric acetate dissolved in 25 cc. water slightly acidulated with acetic acid is added rapid-dropwise with mechanical stirring. After three hours of refluxing, a test for divalent mercury being negative, the reaction mixture is filtered, washed, and dried as in the foregoing examples, yielding the desired compound in the form of white crystals.

*Hydroxy mercuri 3-isopropyl 4-chloro 6-methyl phenol*

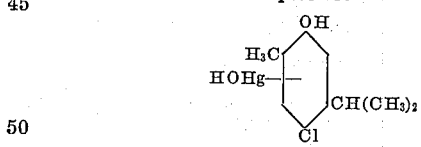

A solution of 8 g. 3-isopropyl 4-chloro 6-methyl phenol in 150 cc. ethyl alcohol is treated in the manner of the foregoing examples with 12.5 g. mercuric acetate in 45 cc. water. After twelve hours of refluxing, a test for divalent mercury being slightly positive and some crystals having formed, the mixture is filtered. The filtrate is made strongly alkaline with dilute alkali, and the grayish muddy precipitate is filtered out. The dark-red alkaline filtrate is acidified with dilute acetic acid, and the reddish-brown precipitate, the desired compound, is filtered off, washed with water and then with alcohol, and dried to a reddish powder, which gives a dark-red solution with dilute alkali.

*Acetoxymercuri 1,3-dihydroxy 4-butyl 6-chloro benzene*

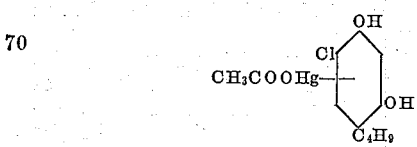

0.9 g. 1,3-dihydroxy 4-butyl 6-chloro benzene is dissolved in 10 cc. ethyl alcohol, and while the solution is refluxed, 1.5 g. mercuric acetate dissolved in 10 cc. water is added. After two hours of refluxing, a test for divalent mercury being negative, and the reaction mixture being brownish and turbid, the alcohol is evaporated off and the mass dissolved in dilute alkali. Finely divided reduced mercury is filtered out. Precipitation is effected by means of acetic acid. For purification, the precipitate is dissolved in boiling alcohol, and a slight residue filtered out. Diluting the alcoholic solution with water yields the desired compound as a pinkish precipitate.

*Acetoxymercuri 2-nitro 4-tertiary-butyl phenol*

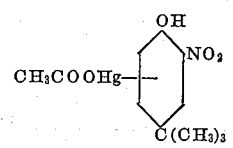

5.14 g. 2-nitro 4-tertiary-butyl phenol is dissolved in 50 cc. methyl alcohol, and while the solution is refluxed on a steam-bath, 8 g. mercuric acetate dissolved in 30 cc. water slightly acidulated with acetic acid is added. After five hours of refluxing, a test for divalent mercury being negative, the precipitate, which is the desired compound, is filtered off, washed successively with a little methyl alcohol, water, and methyl alcohol, and dried to yellow-orange crystals, which give an orange solution in dilute alkali.

*Acetoxymercuri 2-nitro-3,6-dimethyl phenol*

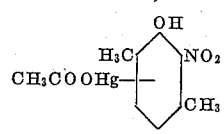

2.19 g. 2-nitro 3,6-dimethyl phenol is dissolved in 13 cc. methyl alcohol, and while the solution is refluxed on a steam-bath, 3.93 g. mercuric acetate dissolved in 13 cc. water slightly acidulated with acetic acid is added. After seven hours of refluxing, a test for divalent mercury being negative, the reddish-brown crystal precipitate, the desired compound, is filtered, washed, and dried as in the preceding example, and is found to give a light-red solution with dilute alkali.

*Acetoxymercuri 2-nitro 4-tertiary-amyl phenol*

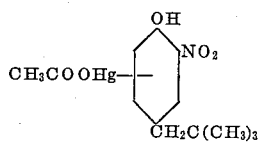

4.4 g. 2-nitro 4-tertiary-amyl phenol is dissolved in 45 cc. methyl alcohol, and while the solution is refluxed on a steam-bath, 6.7 g. mercuric acetate dissolved in 25 cc. water slightly acidulated with acid is added. After eight hours of refluxing, a test for divalent mercury being negative, the crystalline yellow precipitate, the desired compound, is isolated as in the preceding examples.

*Hydroxymercuri 2-nitro 4-propyl phenol*

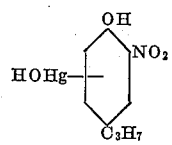

2.3 g. 2-nitro 4-propyl phenol is dissolved in 25 cc.

methyl alcohol, and while the solution is refluxed on a steam-bath, a solution of 4 g. mercuric acetate in 12 cc. water slightly acidulated with acetic acid is added. After four hours of refluxing, a test for divalent mercury being negative, the crystalline orange precipitate, the desired compound, is isolated as in the preceding examples. Purification may be effected by dissolving (to an orange solution) in dilute alkali, filtering out the slight residue, and precipitating with dilute acetic acid.

*Acetoxymercuri 3-methyl 4-nitro 6-isopropyl phenol*

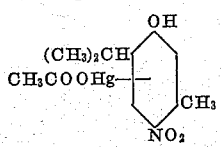

2.5 g. 3-methyl 4-nitro 6-isopropyl phenol is dissolved in 13 cc. methyl alcohol, and while the solution is refluxed on a steam-bath, 4 g. mercuric acetate dissolved in 12 cc. water slightly acidulated with acetic acid is added. After seven hours of refluxing, a test for divalent mercury being negative, the crystalline yellowish precipitate, the desired compound, is isolated as in the preceding examples, and found to give an orange solution with dilute alkali.

Among the numerous other compounds that may be prepared in accordance with the invention are the following (the chloro, the cyano, the thiocyano, the nitrato, and the hydroxy compounds being formed by treating solutions of the acetoxy compound with, respectively, the chloride, the cyanide, the thiocyanide, the nitrate, and the hydroxide, of an alkali metal).

Chloromercuri 2-chloro 4-tertiary-butyl phenol.
Cyanomercuri 2-chloro 4-tertiary-butyl phenol.
Anhydro-mercuri 2-bromo 4-tertiary-butyl phenol.
Anhydro-mercuri 2-chloro 4-normal-butyl phenol.
Anhydro-mercuri 2-chloro 4-normal-amyl phenol.
Acetoxymercuri 1,3-dihydroxy 4-amyl 6-chloro benzene.
Acetoxymercuri 1,3-dihydroxy 4-hexyl 6-chloro benzene.
Chloromercuri 2-chloro 4-propyl phenol.
Acetoxymercuri 2-bromo 4-propyl phenol.
Nitratomercuri 2-nitro 4-normal-butyl phenol.
Thiocyanomercuri 2-nitro 4-normal-amyl phenol.
Chloromercuri 2-nitro 4-propyl phenol.
Acetoxymercuri 2-propyl 4-chloro phenol.
Hydroxymercuri 2-propyl 4-nitro phenol.

It is to be understood that the foregoing examples are merely illustrative and by no means limitative of the invention, which may be variously otherwise embodied within the scope of the appended claims.

We claim:
1. Anhydro-mercuri 2-chloro 4-tertiary-butyl phenol.
2. Acetoxymercuri 2-nitro 4-tertiary-butyl phenol.
3. Mercuri alkyl phenol derivatives of the group consisting of

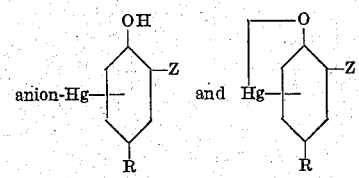

wherein Z represents a member of the group consisting of halogen and nitro; and R represents a branched-chain alkyl.
4. Acetoxymercuri 2-nitro 4-tertiary-amyl phenol.

WALTER G. CHRISTIANSEN.
EUGENE MONESS.